April 7, 1970 A. LEIBUNDGUT ET AL 3,504,945
PNEUMATIC CONVEYER SYSTEM
Filed June 28, 1967
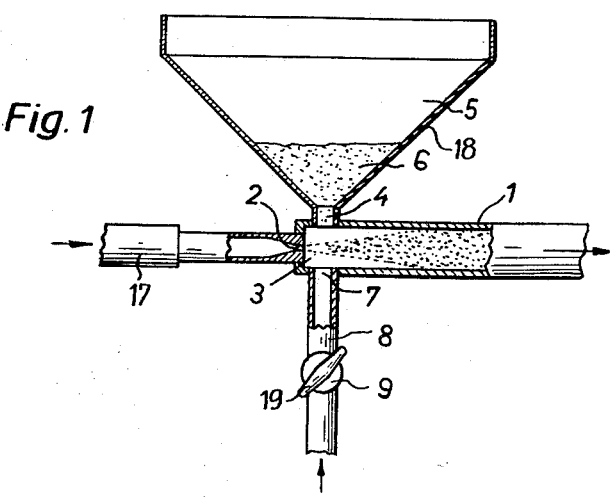
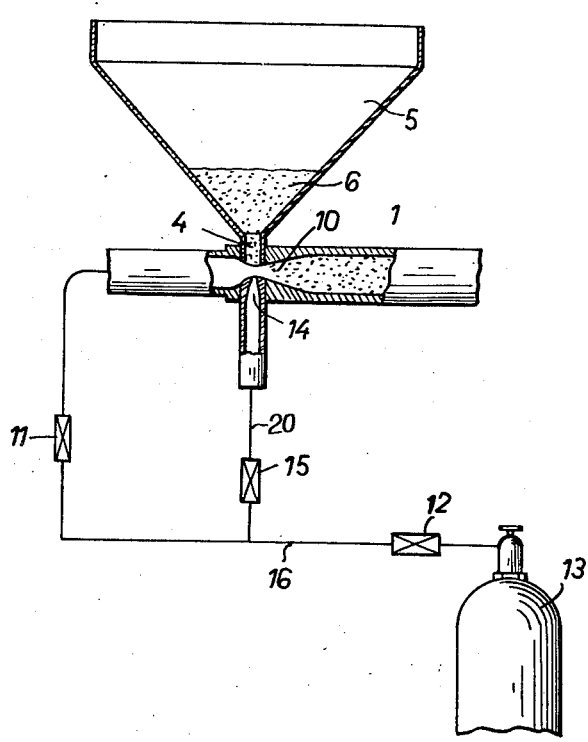
INVENTORS
Alfred Leibundgut and Imre Szasz
BY
Karl W. Flocks
Attorney United States Patent Office 3,504,945
Patented Apr. 7, 1970

3,504,945
PNEUMATIC CONVEYOR SYSTEM
Alfred Leibundgut, Emmen, Lucerne, and Imre Szasz, St. Gall, Switzerland, assignors to Gema AG Apparatebau, St. Gall, Switzerland, a Swiss company
Filed June 28, 1967, Ser. No. 649,523
Claims priority, application Switzerland, June 28, 1966, 9,338/66
Int. Cl. B65g 53/40
U.S. Cl. 302—40                                5 Claims

ABSTRACT OF THE DISCLOSURE

A pneumatic conveyer system which is particularly intended for feeding pulverulent and granular coating material to electrostatic spraying devices comprises a conveyer line into which a propellant gas is supplied by means of a diffusor to create a region of reduced pressure within the conveyor line. The pulverulent or granular material to be conveyed is discharged from a loading hopper into said region of reduced pressure, partly by gravity and partly by the suction action due to the presence of reduced pressure in said region. A variable control gas stream is supplied into said region of reduced pressure to counteract the effect of the reduced pressure on the rate of supply of material from said hopper into the conveyor and to regulate the conveyor output from a maximum value to almost zero value.

---

This invention relates to a pneumatic conveyor system of controllable conveying capacity for loose flowable pulverulent or granular material, of the kind in which the material is supplied from a loading hopper and blown through the conveyer line by means of a propellant gas fed into the line by diffusor means.

In pneumatic conveyers the control of the conveying output usually is effected by varying the supply of material to be conveyed, while the propellant gas stream remains constant. As a simple means for adjusting the supply of material, the outlet of the loading hopper is usually provided with a regulating gate for varying the sectional area of flow of the outlet opening. A substantially more precise regulation of the supplied material will be obtained by means of feed screws adapted to rotate at a variable speed.

In many cases, for example when the conveyer is used to supply pulverulent materials to spraying devices for electrostatic coating, the provision of regulating gates does not permit a sufficiently precise and reliable dosage of coating material, while the use of feed screws is too cumbersome in combination with such spraying devices.

It is an object of the invention to provide a pneumatic conveyer system which enables the regulation of the conveyer output from a maximum value until almost to zero, while the propellant gas stream remains constant, and to obtain a uniform rate of delivery for any position of adjustment of the conveyer, without requiring a complicated and expensive regulating equipment.

According to the invention, a pneumatic conveyor system of the kind referred to above comprises an inlet duct arranged to supply material from said loading hopper into said conveyer line and opening into said diffusor means at a region of substantial vacuum, a second duct also opening into said diffusor means at said region of substantial vacuum and arranged to supply an additional gas into said region, and means for controlling the supply of additional gas through said second duct.

Two embodiments of the invention are represented by way of example in the accompanying drawings, in which:

FIGURE 1 is a sectional view of a pneumatic conveyor according to the invention for conveying measured pulverulent material, FIGURE 2 is a modification, also shown in section, of a pneumatic conveyor which is particularly suitable for conveying granular material.

Referring to FIGURE 1, a propellant gas, for example compressed air, is fed into a conveyer line 1 through a supply tube 17 opening into the line 1 by means of a narrow nozzle 2. The stream of compressed air delivered through the nozzle 2 into the conveyer line 1 of larger diameter expands in the line 1 and creates an annular space 3 of reduced pressure around the nozzle opening 2. The nozzle and the adjacent space 3 of larger diameter thus form a diffusor for the incoming propellant gas. The regions of the highest vacuum, as is well known, are situated immediately in front and laterally of the nozzle opening. A discharge opening or duct 4 of a loading hopper 5 opens from the top into the line 1 at the region 3 of substantial vacuum. The container 5 is provided with a bottom wall 18 tapering towards the discharge duct 4, so that the pulverulent flowable material 6 in the hopper partially arrives in the conveyer line 1 owing to gravity and partially is drawn in to the line 1 owing to the vacuum underneath the opening 4. Instead of entering vertically into the space 3, as diagrammatically shown, the duct 4 preferably enters laterally in this space.

A circular opening 7 is provided in the conveyer line 1 opposite the duct opening 4. This opening 7 also is situated adjacent a region of maximum vacuum or suction action in the diffuser portion of the conveyer line.

The opening 7 forms the discharge end of a duct or tube 8 connected to the conveyer line 1 and extending at right angles thereto. When the conveyer operates, the vacuum in the annular space 3 acts to draw air through the tube 8 into the conveyer line which air reduces the vacuum in the space 3; thus the pulverulent material 6 in the container is drawn into the conveyer line 1 at a reduced rate. The amount of air drawn in by the effect of the propellant gas stream delivered through the nozzle 2 can be easily regulated for example by a valve 9. To each position of adjustment of the valve 9 corresponds a stable pressure condition in the space 3 with a certain defined rate of suction. According to the rate of suction, more or less pulverulent material 6 will be drawn into the conveyer line 1. When air is drawn into the line 1 through the opening 7, at a rate such that practically the vacuum in the space 3 completely disappears, then the propellant gas stream entering through the nozzle 2 only conveys that amount of pulverulent material which falls by gravity through the discharge opening 4. By impacting a suitable shape to the discharge opening 4 this amount can be greatly reduced. Particularly when pulverulent material is to be conveyed the diameter of the opening 4 can be made quite small.

It is essential for the conveyer arrangement according to the invention that an opening is provided in the conveyer line in the region of the greatest vaccum, through which opening a controllable amount of air or gas can be fed into the conveyer line. In the example shown the stream of air or gas is regulated by turning the valve plug 19. Other regulating arrangements are obviously possible, for example, the conveyer line 1 may be provided with one or several openings in the region of the space 3, which openings may cooperate with an annular slide having corresponding openings for throttling more or less the air or gas intake. The tube 8 not only serves as carrier for the valve 9, 19, but also to create a stream of air or gas having a certain velocity at its entry into the conveyor line 1. The effect of such a stream will be apparent particularly in an arrangement according to FIG. 2.

The conveyer shown in FIGURE 2 is similar to that of FIGURE 1, but the diffusor is formed as a venturi tube 10 to which nitrogen is fed as a propellant gas from a pressure container 13 through a conduit 16 provided with a control valve 11 and a pressure reducing valve 12. The outlet 4 of the container 5 opens into the line 1 at the zone of constriction of the venturi tube 10. A nozzle 14 also opens into the venturi tube at a point opposite to the outlet 4. The nozzle 14 is connected to the nitrogen conduit 16 by a conduit 20 provided with a control valve 15.

During operation of the conveyer the propellent gas stream will be adjusted to a predetermined fixed value by the control valve 11. The amount of additional gas fed through the conduit 20 is regulated by the control valve 15. When this valve is open, a comparatively strong gas stream is discharged by the nozzle 14 into the venturi tube 10. A pressure component of this stream acts in opposition to the stream of granular material entering through the outlet 4. In addition to reducing the suction action created by the venturi tube 10, the stream of additional gas fed by the nozzle 14 impedes the discharge of granular material through the outlet 4 and still further reduces the amount of conveyed material. Care has to be taken that the additional control gas stream is not so powerful, particularly with a small filling level of granular material in the feed hopper 5, as to blow the material out of the hopper.

Conveyer systems of the described type have proven to permit an extremely precise adjustment of the conveyed amount of pulverulent or granular material. The stream of conveyed material remains constant for each setting of the control valves of the propellant gas stream and of the additional control gas stream and the control range of the conveyer capacity extends between a maximum value depending on geometric design of the system, on the pressure of the propellant gas and on the nature of the material to be conveyed, and any desired small values.

We claim:

1. A pneumatic conveying system for uniformly dispensing a controlled amount of loose, gravity-flowable, pulverulent and/or granular material used in electrostating spraying devices in which the material is supplied from a loading hopper and blown through a conveyor line by means of a pneumatic pressure fed into the line by diffuser means, comprising:

a supply hopper having a lower, downwardly angled bottom terminating in a lower discharge through which pulverulent material will have free, uninterrupted gravity flow,
   said discharge having an unvarying, fixed free opening throughout whereby agglomeration of the pulverulent material is obviated,
a conveyor line in direct, uninterrupted communication with said discharge and extending generally normal to said discharge,
   said conveyor line including means for creating a region of substantial vacuum in intersecting relation to the hopper discharge whereby pulverulent material is drawn uninterruptedly from said discharge;
a duct opening into said region of substantial vacuum and arranged to direct a pneumatic pressure into said region and in direct opposition to said unvarying, fixed free opening; and
means for controlling the pneumatic pressure in said duct to adjust the degree of vacuum at said region of substantial vacuum to determine the effective vacuum for drawing pulverulent material directly from said hopper discharge.

2. The system as claimed in claim 1 including means operatively connected to said second duct for adjustably varying the effective pressure emitted from said second duct.

3. The system as claimed in claim 1, in which said second duct opening has an axis directed toward the opening of the inlet duct of said loading hopper.

4. The system as claimed in claim 1, in which the opening of said second duct comprises a nozzle having a restricted opening, a pressurized gas supply connected to said nozzle, and a control valve operatively connected between said nozzle and said pressurized gas supply.

5. The system as claimed in claim 1 in which said conveyor line includes a venturi tube having a restricted portion, said loading hopper inlet duct and second duct opening being disposed in opposed relation at the restricted portion of said venturi tube.

References Cited

UNITED STATES PATENTS

| 1,566,325 | 12/1925 | Hansen | 302—40 X |
| 2,584,378 | 2/1952 | Beam | 302—51 |

ANDRES H. NIELSEN, Primary Examiner

U.S. Cl. X.R.

302—51